US005802588A

United States Patent [19]

Ramagopal et al.

[11] Patent Number: 5,802,588

[45] Date of Patent: Sep. 1, 1998

[54] LOAD/STORE UNIT IMPLEMENTING NON-BLOCKING LOADS FOR A SUPERSCALAR MICROPROCESSOR AND METHOD OF SELECTING LOADS IN A NON-BLOCKING FASHION FROM A LOAD/STORE BUFFER

[75] Inventors: H. S. Ramagopal; Rajiv M. Hattangadi; Muralidharan S. Chinnakonda, all of Austin, Tex.

[73] Assignee: Advanced Micro Devices, Inc., Sunnyvale, Calif.

[21] Appl. No.: 858,583

[22] Filed: May 19, 1997

Related U.S. Application Data

[63] Continuation of Ser. No. 421,211, Apr. 12, 1995, abandoned.

[51] Int. Cl.⁶ ..................................................... G06F 12/00
[52] U.S. Cl. ........................... 711/156; 711/118; 711/144
[58] Field of Search ................................ 395/375, 376, 395/250, 445, 467, 471, 472, 478, 481, 483, 485, 490, 494, 496, 561, 566, 800; 711/118, 144, 156

[56] References Cited

U.S. PATENT DOCUMENTS

| | | | |
|---|---|---|---|
| 4,044,338 | 8/1977 | Wolf | 365/49 |
| 4,370,710 | 1/1983 | Kroft | 395/455 |
| 4,453,212 | 6/1984 | Gaither et al. | 395/402 |
| 4,807,115 | 2/1989 | Torng | 395/391 |
| 4,858,105 | 8/1989 | Kuriyama et al. | 395/582 |

(List continued on next page.)

FOREIGN PATENT DOCUMENTS

| | | |
|---|---|---|
| 0259095 | 3/1988 | European Pat. Off. . |
| 0381471 | 8/1990 | European Pat. Off. . |
| 0 391 517 A | 10/1990 | European Pat. Off. . |
| 0 436 092 A | 7/1991 | European Pat. Off. . |
| 0459232 | 12/1991 | European Pat. Off. . |
| 5-298097 | 11/1993 | Japan . |
| 2263985 | 8/1993 | United Kingdom . |
| 2263987 | 8/1993 | United Kingdom . |
| 2281422 | 3/1995 | United Kingdom . |

OTHER PUBLICATIONS

Intel, "Chapter 2: Microprocessor Architecture Overview," pp. 2–1 through 2–4.

Michael Slater, "AMD's K5 Designed to Outrun Pentium," Microprocessor Report, vol. 8, No. 14, Oct. 24, 1994, 7 pages.

Sebastian Rupley and John Clyman, "P6: The Next Step?," PC Magazine, Sep. 12, 1995, 16 pages.

Tom R. Halfhill, "AMD K6 Takes On Intel P6," BYTE, Jan. 1996, 4 pages.

Blount, F.T. et al. "Deferred Cache Storing Method", IBM Technical Disclosure Bulletin, vol. 23, No. 1, pp. 262–263, Jun. 1980.

Pierce, Jim and Trevor Mudge, "The Effect on Speculative Execution on Cache Performance", Parallel Processing 1994 Symposium, 1994.

(List continued on next page.)

Primary Examiner—Tod R. Swann
Assistant Examiner—Conley B. King, Jr.
Attorney, Agent, or Firm—Conley, Rose & Tayon; B. Noel Kivlin

[57] ABSTRACT

A load/store buffer is provided which allows both load memory operations and store memory operations to be stored within it. Memory operations are selected from the load/store buffer for access to the data cache, including cases where the memory operation selected is subsequent in program order to a memory operation which is known to miss the data cache and is stored in the buffer. In this way, other memory operations that may be waiting for an opportunity to access the data cache may make such accesses, while the memory operations that have missed await an opportunity to make a main memory request. Memory operations that have missed are indicated by a miss bit being set, so that the mechanism which selects memory operations to access the data cache may ignore them until they become non-speculative.

22 Claims, 6 Drawing Sheets

U.S. PATENT DOCUMENTS

| | | | |
|---|---|---|---|
| 5,179,679 | 1/1993 | Shoemaker | 395/445 |
| 5,185,871 | 2/1993 | Frey et al. | 395/375 |
| 5,226,126 | 7/1993 | McFarland et al. | 395/394 |
| 5,226,130 | 7/1993 | Favor et al. | 395/585 |
| 5,333,276 | 7/1994 | Solari | 395/287 |
| 5,353,426 | 10/1994 | Patel et al. | 395/445 |
| 5,375,216 | 12/1994 | Moyer et al. | 395/421 |
| 5,379,396 | 1/1995 | Gochman et al. | 395/468 |
| 5,418,973 | 5/1995 | Ellis et al. | 395/800 |
| 5,434,987 | 7/1995 | Abramson et al. | 395/375 |
| 5,450,564 | 9/1995 | Hassler et al. | 395/495 |
| 5,454,117 | 9/1995 | Puziol et al. | 395/800 |
| 5,455,924 | 10/1995 | Shenoy et al. | 395/445 |
| 5,471,598 | 11/1995 | Quattromani et al. | 395/449 |
| 5,517,657 | 5/1996 | Rodgers et al. | 395/800 |
| 5,524,263 | 6/1996 | Griffith et al. | 395/800 |
| 5,526,510 | 6/1996 | Akkary et al. | 395/460 |
| 5,555,392 | 9/1996 | Chaput et al. | 395/445 |
| 5,557,763 | 9/1996 | Senter et al. | 395/800 |

OTHER PUBLICATIONS

Farkas, Keith I. et al. "How Usefule Are Non–blocking Loads, Stream Buffers and Speculative Execution in Multiple Issue Processor?", High Performance Computer Architecture, 1995 Symposium, 1995.

Farkas, Keith I. and Norman P. Jouppi. "Complexity/Performance Tradeoffs with Non–Blocking Loads", Computer Architecture, 1994 International Symposium, 1994.

Popescu, Val et al. "The Metaflow Architecture". IEEE Micro, Jun. 1991.

Johnson, Mike. Superscalar Microprocessor Design. Prentice Hall, 1991, pp. 1–289.

Diefendorff, Kieth and Michael Allen. "Organization of the Motorola 88110 Superscalar RISC Microprocessor", IEEE Micro, Apr. 1992.

LOAD/STORE UNIT IMPLEMENTING NON-BLOCKING LOADS FOR A SUPERSCALAR MICROPROCESSOR AND METHOD OF SELECTING LOADS IN A NON-BLOCKING FASHION FROM A LOAD/STORE BUFFER

This application is a continuation of application Ser. No. 08/421,211, filed Apr. 12, 1995, now abandoned.

BACKGROUND OF THE INVENTION

1. Field of the Invention

This invention relates to superscalar microprocessors and, more particularly, to a load/store unit of a superscalar microprocessor.

2. Description of the Relevant Art

Superscalar microprocessors obtain high performance in computer systems by attempting to execute multiple instructions concurrently. One important way in which superscalar microprocessors achieve high performance is through the use of speculative execution of instructions. As used herein, an instruction is speculatively executed if it is executed before the execution is known to be required by the program being executed. An instruction may be executed speculatively, for example, if a branch instruction is ahead of it in program instruction sequence and the processor has not yet calculated which path through the program the branch will select. Many other examples of speculatively executing instructions exist in superscalar microprocessors.

Due to the widespread popularity and acceptance of the x86 architecture, microprocessor designers have made efforts to create superscalar microprocessors that implement this architecture. By supporting this architecture, such designers advantageously maintain backwards compatibility with previous implementations such as the 8086, 80286, 80386, and 80486; and the large amount of software written for these implementations.

Superscalar microprocessors are employed within computer systems. These computer systems typically contain a variety of other devices including fixed disk drives, video display adapters, floppy disk drives, etc. Also needed in computer systems is a relatively large main memory which stores the instructions that the microprocessor will execute and data the microprocessor will manipulate, until such data or instructions are requested by the microprocessor. This memory is typically composed of dynamic random access memory chips, herein referred to as "DRAM". The amount of time necessary from the request of a storage location within the DRAM to the data becoming available at the outputs of the DRAM chips, herein referred to as DRAM access time, has not decreased significantly. Instead, as semiconductor fabrication technology has improved, DRAM manufacturers have chosen to make larger amounts of DRAM memory available on a single monolithic chip. Although a single memory location in a modern DRAM can react much faster than locations in older DRAM, the larger number of locations available loads the outputs of the DRAM, making the DRAM access time substantially the same from generation to generation of DRAM devices. However, superscalar microprocessor designers have used semiconductor manufacturing technology improvements to create microprocessors that run at faster clock rates and that are capable of executing more instructions simultaneously. As used herein "clock cycle" or "clock rate" refers to a unit of time in which a microprocessor performs its various functions, such as instruction execution, memory request, etc. At the end of a clock cycle, the results for that cycle (such as the result an instruction execution produces) are saved so that another part of the microprocessor (i.e. a subsequent pipe stage) will have the results available in the next clock cycle for subsequent manipulation or storage. As a result of the aforementioned speed difference between modern microprocessors and DRAM memory, the memory bandwidth requirements of microprocessors have increased but available memory bandwidth has not increased. In other words, more recent microprocessors are running substantially faster than older microprocessors and are coupled to larger DRAM memories (allowing larger applications and data sets) that are running at a speed similar to previous versions of DRAM memories. A large performance problem can be seen with this configuration, in that the microprocessor in many cases will be waiting for instructions and data to be provided by memory, reducing the computer system's overall performance.

Superscalar microprocessor designers have made efforts to solve the problem of accessing a slow memory. Part of this solution involves including caches into the microprocessor designs. Caches are small, fast memories that are either included on the same monolithic chip with the microprocessor core, or are coupled nearby. Data and instructions that have been used recently by the microprocessor are typically stored in these caches, and are written back to memory after the instructions and data have not been accessed by the microprocessor for some time. The amount of time necessary before instructions and data are vacated from the cache and the particular algorithm used therein varies significantly among microprocessor designs, and are well known. Data and instructions may be stored in a shared cache, variously referred to as a combined cache or a unified cache. Also, data and instructions may be stored in distinctly separated caches, typically referred to as an instruction cache and a data cache.

Caches are typically organized as an array of "lines". The term "line" is used herein to refer to some number of memory locations configured to store contiguous bytes of data or instructions from main memory. When the microprocessor accesses the cache, a portion of the address is used to "index" the cache. Indexing the cache refers to choosing a line or set of lines to access, searching for the contents of the address being requested. If one of the lines so examined contains the data or instructions that reside in main memory at the requested address, then the access is said to be a "hit". If none of the lines selected in accordance with the above indexing contains the data or instructions that reside in main memory at the requested address, then the access is said to be a "miss". When the cache is configured such that more than one line is associated with a given index, then the lines are typically referred to as "ways" of that index.

Some caches are capable of handling multiple accesses simultaneously. Caches configured in this way may have "banks" wherein the cache memory cells are configured into separately accessible portions. Therefore, one access can address one bank, and a second access a second, independent bank, and so on.

As superscalar microprocessor designers have continued to increase the number of instructions that are executed concurrently, caches have become an insufficient solution to the performance problems associated with large, slow memories. First, the caches are much smaller than the main memory. Therefore, it is always true that some data or instructions requested by the microprocessor will not be currently residing in the cache. The chips and/or silicon area required to build caches are expensive, so making the caches larger increases the overall computer system cost significantly. Second, caches typically hold data and instructions that have been previously requested by the microprocessor. Therefore, whenever the microprocessor begins a new program or accesses a memory location for the first time, a significant number of accesses to the main memory are required. When used in the context of a superscalar microprocessor as described herein, access means either a request for the contents of a memory location or the modification of the contents thereof. Third, in modern day microprocessors the amount of time necessary to access data or instructions in the cache is becoming a performance problem in the same way that DRAM access times have been.

In an attempt to solve some of the problems associated with caches, some microprocessors implement a "prefetching algorithm" wherein the microprocessor attempts to guess which memory locations it will be accessing in the near future and makes main memory requests for these locations. These schemes have had varying degrees of success. However, such schemes can also deleteriously affect the performance of the microprocessor in some situations. Whenever a significant number of wrong guesses are made, the microprocessor will replace data or instructions in the cache with the contents of memory locations that it does not need. This, in turn, will cause memory references to retrieve the data that had been replaced by the prefetched data.

Retrieving data from main memory is typically performed in superscalar microprocessors through the use of a load instruction. This instruction may be explicit, wherein the load instruction is actually coded into the software being executed. This instruction may also be implicit, wherein some other instruction (an add, for example) directly requests the contents of a memory location as part of its input operands.

Storing the results of instructions back to main memory is typically performed in superscalar microprocessors through the use of a store instruction. As with the aforementioned load instruction, the store instruction may be explicit or implicit. As used herein, "memory operations" will be used to refer to load and/or store instructions.

In modern superscalar microprocessors, memory operations are typically executed in one or more load/store units. These units execute the instruction, access the data cache (if one exists) attempting to find the requested data, and handle the result of the access. As described above, data cache access typically has one of two results: a miss or a hit.

A load/store unit typically also handles other, special conditions associated with memory operations. For example, an access may be "unaligned" or "misaligned". A memory operation requests or modifies data of a particular size, typically measured in bytes. The size for a particular memory operation depends on many things, including the architecture that the microprocessor is implemented to and the particular instruction that created the memory operation. A memory operation is said to be unaligned or misaligned if the address calculated by the memory operation does not have a number of zeros in its least significant binary digits (or "bits") equal to or greater than the sum of 2 raised to a power equal to the size of the requested datum and minus one. The formula for calculating the required number of least significant zeros is:

$$2^{(size\ of\ memory\ request\ in\ bytes)} - 1.$$

Unaligned accesses sometimes require multiple accesses to the data cache and/or memory.

Most instructions that a microprocessor executes ultimately received their operands from main memory or the data cache. The operands a particular instruction receives may have been requested from memory directly, or may be the result of some other instruction whose operands were requested from memory. Therefore, the performance of a superscalar microprocessor when running many programs is dependent in large part on how quickly the load/store unit can execute memory operations. In many superscalar microprocessors, the load/store unit executes one memory operation per clock cycle. Also, if a memory operation is found to miss the data cache, the load/store unit often ceases instruction execution until the missed address has been transferred from main memory. Thus, a memory operation that misses the data cache "blocks" subsequent memory operations from executing, even if they may hit the data cache. Blocking the subsequent memory accesses in many cases deleteriously affects performance of the superscalar microprocessor because instructions that require the data from the memory accesses cannot execute as quickly as might otherwise be possible.

Some superscalar microprocessors attempt to solve the aforementioned blocking problem by placing miss requests into a buffer between the data cache and the main memory interface. The buffer may be configured, for example, as a queue with a certain number of entries. While this buffering mechanism does help solve the blocking problem, more silicon area on the microprocessor chip is necessary to implement the buffers and the associated control functions. Furthermore, complexities are introduced in the form of comparators between accesses to the cache and the accesses that are currently queued. Without these comparators, multiple requests to the same miss line would be allowed into the buffer, causing multiple transfers to and from main memory to occur, thus deleteriously affecting performance. Only one transfer to or from main memory is necessary; as a result, the other memory operations that access the same line may fetch their data from the data cache. If more than one transfer to or from main memory of a given line are queued, these extraneous transfers will delay further requests for main memory, deleteriously affecting performance. Exemplary forms of superscalar microprocessors implementing such a buffering solution include the PowerPC 601 microprocessor produced by IBM Corporation and Motorola, Inc., and the Alpha 21164 microprocessor produced by Digital Equipment Corporation.

Another component of a load/store unit that may directly affect performance of a superscalar microprocessor is the number of buffer entries that store memory operations awaiting operands or an opportunity to access the data cache. In many implementations, a queue structure is used for the buffer. Typically, a buffer is provided for load memory operations and another, separate buffer is provided for store memory operations. When one of these buffers fills, a subsequent memory operation of that type may stall instruction execution of the entire microprocessor until it is allowed into the buffer, deleteriously affecting performance. Memory operations are placed into these buffers when dispatched to the load/store unit and are removed when data cache access is attempted, or sometime thereafter. When used in the context of operating on a memory operation, the term "remove" refers to the act of invalidating the storage location containing the memory operation. The act of invalidating may be accomplished, for example, by changing the state of a particular bit associated with the storage location or overwriting the storage location with a new memory operation. Much of the design time for a load/store unit is dedicated to choosing the size of these buffers such that the amount of processor stall time due to these buffers being full is minimized. The choice is further complicated by the fact that buffers require silicon area to implement, so an arbitrarily large number of queues cannot be used. The choice is still further complicated by the fact that the mix of instructions in common software programs is constantly changing, such that studying older programs to choose queue sizes may result in a less than optimal design.

SUMMARY OF THE INVENTION

The problems outlined above are in large part solved by a superscalar microprocessor employing a load/store unit with a load/store buffer implementing a non-blocking load selection strategy in accordance with the present invention. In one embodiment, a load/store buffer is provided which allows both load memory operations and store memory operations to be stored within it. Memory operations are selected from the load/store buffer for access to the data cache, including cases where the memory operation selected is subsequent in program order to a memory operation which is known to miss the data cache and is stored in the buffer.

In one embodiment, a device of the present invention is configured to store memory requests that miss the data cache until such time as they are allowed to make a main memory request. In this way, other memory operations that may be waiting for an opportunity to access the data cache may make such accesses, while the memory operations that have missed await an opportunity to make a main memory request. Therefore, the device of the present invention solves the aforementioned "blocking" problem.

One miss is permitted to make a request to main memory, and when the line associated with the request is stored into the data cache, misses are allowed to reaccess the data cache. Those whose addresses are contained in the newly received line will then be completed as data cache hits. This implementation advantageously removes the buffers used in previous implementations to store data cache misses, along with some of the control logic necessary to operate those buffers. In particular, the comparators that were required to restrict accesses to one per missed line are removed. Instead, the misses remain in the unified buffer until one miss is transferred into the cache from main memory, then misses are attempted to the data cache again. If a memory operation remains a miss after this access, it will continue to reside in the buffer, and another request for main memory transfer will be initiated.

Broadly speaking, the invention contemplates a load/store unit comprising a buffer and an output control unit. The buffer includes a plurality of storage locations configured to store information regarding pending memory operations. The buffer further includes an input port configured to receive the memory operation information. The buffer also includes a data cache port configured to communicate data access commands to a data cache. Associated with each of the plurality of storage locations within the buffer is a miss bit. The miss bit is set during a clock cycle that the memory operation stored in the associated storage location access the data cache and is found to miss.

The output control unit of the invention is coupled to the buffer, and is configured to select a memory operation stored within one of the plurality of storage locations within the buffer to access the data cache. The output control unit is further configured to direct data cache access commands associated with the operation to the data cache.

The invention further contemplates a method for selecting a second memory operation stored in a load/store buffer for access to a data cache during a clock cycle in which a first memory operation stored in the load/store buffer is speculative and is known to miss the data cache, comprising two steps. The first step involves examining the first memory operation to determine that a miss bit associated with said first memory operation is set. The second step is selecting said second memory operation because said miss bit associated with said first memory operation is set.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 1:
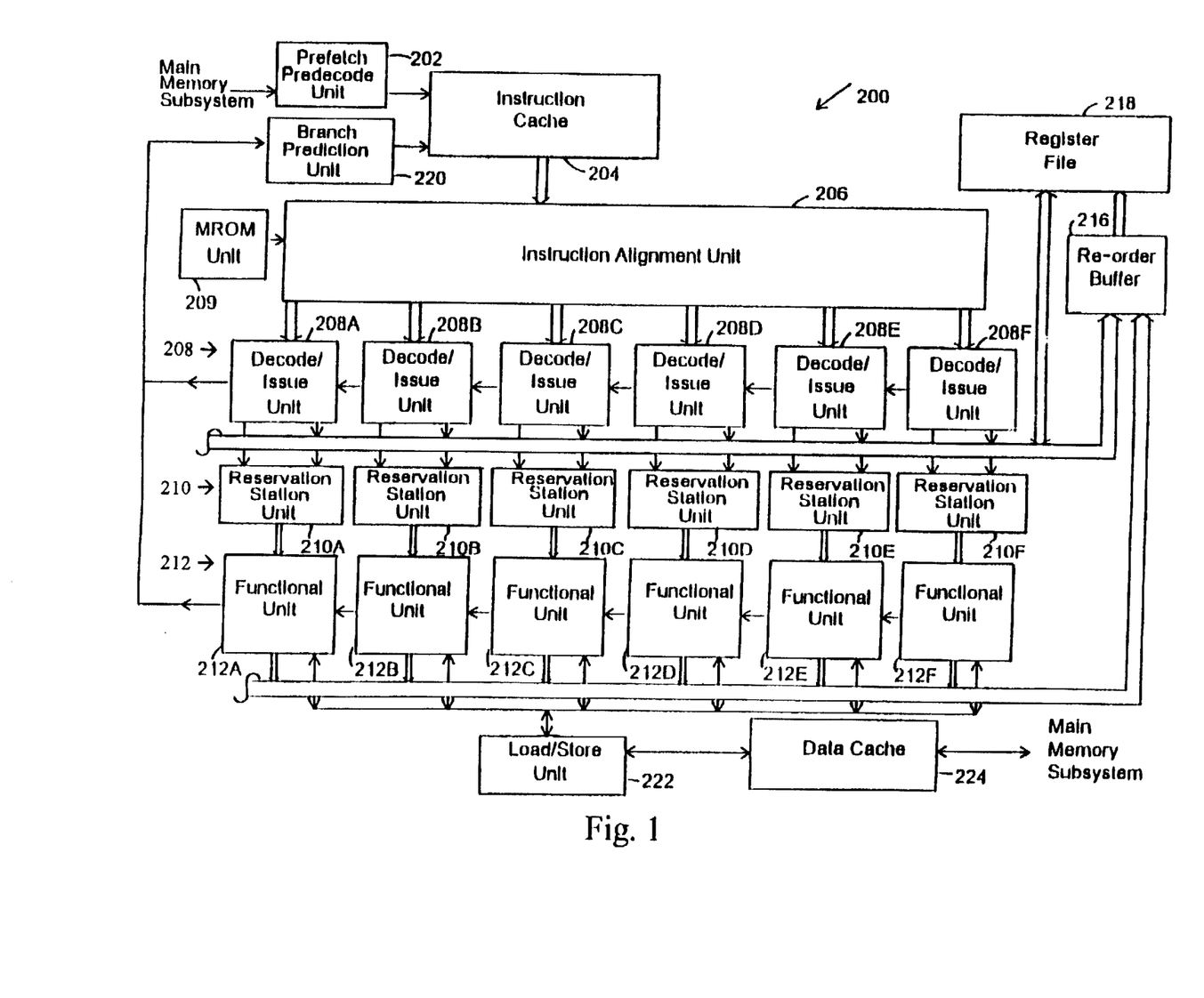
FIG. 1 is a block diagram of a superscalar microprocessor which includes a load/store unit coupled to a data cache, 6 functional units and 6 decode units.

Turning now to the drawings, FIG. 1 shows a block diagram of a superscalar microprocessor 200 including a load/store unit 222 in accordance with the present invention. As illustrated in the embodiment of FIG. 1, superscalar microprocessor 200 includes a prefetch/predecode unit 202 and a branch prediction unit 220 coupled to an instruction cache 204. Instruction alignment unit 206 is coupled between instruction cache 234 and a plurality of decode units 208A–208F (referred to collectively as decode units 208). Each decode unit 208A–208F is coupled to a respective reservation station unit 210A–210F (referred collectively as reservation stations 210), and each reservation station 210A–210F is coupled to a respective functional unit 212A–212F (referred to collectively as functional units 212). Decode units 208, reservation stations 210, and functional units 212 are further coupled to a reorder buffer 216, a register file 218 and a load/store unit 222. A data cache 224 is finally shown coupled to load/store unit 222, and an MROM (microcode need only memory) unit 209 is shown coupled to instruction alignment unit 206.

Generally speaking, instruction cache 204 is a high speed cache memory provided to temporarily store instructions prior to their dispatch to decode units 208. In one embodiment, instruction cache 204 is configured to cache up to 32 kilobytes of instruction code organized in lines of 16 bytes each (where each byte consists of 8 bits). During operation, instruction code is provided to instruction cache 204 by prefetching code from a main memory (not shown) through prefetch/predecode unit 202. It is noted that instruction cache 204 could be implemented in a set-associative, a fully-associative, or a direct-mapped configuration.

Prefetch/predecode unit 202 is provided to prefetch instruction code from the main memory for storage within instruction cache 204. In one embodiment, prefetch/predecode unit 202 is configured to burst 64-bit wide code from the main memory into instruction cache 204. It is understood that a variety of specific code prefetching techniques and algorithms may be employed by prefetch/predecode unit 202.

As prefetch/predecode unit 202 fetches instructions from the main memory, it generates three predecode bits associated with each byte of instruction code: a start bit, an end bit, and a "functional" bit. The predecode bits form tags indicative of the boundaries of each instruction. The predecode tags may also convey additional information such as whether a given instruction can be decoded directly by decode units 208 or whether the instruction must be executed by invoking a microcode procedure controlled by MROM unit 209, as will be described in greater detail below.

Table 1 indicates one encoding of the predecode tags. As indicated within the table, if a given byte is the first byte of an instruction, the start bit for that byte is set. If the byte is the last byte of an instruction, the end bit for that byte is set. If a particular instruction cannot be directly decoded by the decode units 208, the functional bit associated with the first byte of the instruction is set. On the other hand, if the instruction can be directly decoded by the decode units 208, the functional bit associated with the first byte of the instruction is cleared. The functional bit for the second byte of a particular instruction is cleared if the opcode is the first byte, and is set if the opcode is the second byte. It is noted that in situations where the opcode is the second byte, the first byte is a prefix byte. The functional bit values for instruction byte numbers 3–8 indicate whether the byte is a MODRM (mode register/memory)or an SIB (scale-index-base) byte, as well as whether the byte contains displacement or immediate data.

TABLE 1

| Encoding of Start, End and Functional Bits | | | | |
|---|---|---|---|---|
| Instr. Byte Number | Start Bit Value | End Bit Value | Functional Bit Value | Meaning |
| 1 | 1 | X | 0 | Fast decode |
| 1 | 1 | X | 1 | MROM instr. |
| 2 | 0 | X | 0 | Opcode is first byte |
| 2 | 0 | X | 1 | Opcode is this byte, first byte is prefix |
| 3–8 | 0 | X | 0 | Mod R/M or SIB byte |
| 3–8 | 0 | X | 1 | Displacement or immediate data; the second functional bit set in bytes |

TABLE 1-continued

| Encoding of Start, End and Functional Bits | | | | |
|---|---|---|---|---|
| Instr. Byte Number | Start Bit Value | End Bit Value | Functional Bit Value | Meaning |
| | | | | 3–8 indicates immediate data |
| 1–8 | X | 0 | X | Not last byte of instruction |
| 1–8 | X | 1 | X | Last byte of instruction |

As stated previously, in one embodiment certain instructions within the x86 instruction set may be directly decoded by decode unit 208. These instructions are referred to as "fast path" instructions. The remaining instructions of the x86 instruction set are referred to as "MROM instructions". MROM instructions are executed by invoking MROM unit 209. When an MROM instruction is encountered, MROM unit 209 parses and serializes the instruction into a subset of defined fast path instructions to effectuate a desired operation.

Instruction alignment unit 206 is provided to channel or "funnel" variable byte length instructions from instruction cache 204 to fixed issue positions formed by decode units 208A–208F. Instruction alignment unit 206 is configured to channel instruction code to designated decode units 208A–208F depending upon the locations of the start bytes of instructions within a line as delineated by instruction cache 204. In one embodiment, the particular decode unit 208A–208F to which a given instruction may be dispatched is dependent upon both the location of the start byte of that instruction as well as the location of the previous instruction's start byte, if any. Instructions starting at certain byte locations may further be restricted for issue to only one predetermined issue position. Specific details follow.

Before proceeding with a detailed description of the load/store unit 222, general aspects regarding other subsystems employed within the exemplary superscalar microprocessor 200 of FIG. 1 will be described. For the embodiment of FIG. 1, each of the decode units 208 includes decoding circuitry for decoding the predetermined fast path instructions referred to above. In addition, each decode unit 208A–208F routes displacement and immediate data to a corresponding reservation station unit 210A–210F. Output signals from the decode units 208 include bit-encoded execution instructions for the functional units 212 as well as operand address information, immediate data and/or displacement data.

The superscalar microprocessor of FIG. 1 supports out of order execution, and thus employs reorder buffer 216 to keep track of the original program sequence for register read and write operations, to implement register renaming, to allow for speculative instruction execution and branch misprediction recovery, and to facilitate precise exceptions. As will be appreciated by those of skill in the art, a temporary storage location within reorder buffer 216 is reserved upon decode of an instruction that involves the update of a register to thereby store speculative register states. Reorder buffer 216 may be implemented in a first-in-first-out configuration wherein speculative results move to the "bottom" of the buffer as they are validated and written to the register file, thus making room for new entries at the "top" of the buffer. Other specific configurations of reorder buffer 216 are also possible, as will be described further below. If a branch prediction is incorrect, the results of speculatively-executed instructions along the mispredicted path can be invalidated in the buffer before they are written to register file 218.

The bit-encoded execution instructions and immediate data provided at the outputs of decode units 208A–208F are routed directly to respective reservation station units 210A–210F. In one embodiment, each reservation station unit 210A–210F is capable of holding instruction information (i.e., bit encoded execution bits as well as operand values, operand tags and/or immediate data) for up to three pending instructions awaiting issue to the corresponding functional unit. It is noted that for the embodiment of FIG. 1, each decode unit 208A–208F is associated with a dedicated reservation station unit 210A–210F, and that each reservation station unit 210A–210F is similarly associated with a dedicated functional unit 212A–212F. Accordingly, six dedicated "issue positions" are formed by decode units 208, reservation station units 210 and functional units 212. Instructions aligned and dispatched to issue position 0 through decode unit 208A are passed to reservation station unit 210A and subsequently to functional unit 212A for execution. Similarly, instructions aligned and dispatched to decode unit 208B are passed to reservation station unit 210B and into functional unit 212B, and so on.

Upon decode of a particular instruction, if a required operand is a register location, register address information is routed to reorder buffer 216 and register file 218 simultaneously. Those of skill in the art will appreciate that the x86 register file includes eight 32 bit real registers (i.e., typically referred to as EAX, EBX, ECX, EDX, EBP, ESI, EDI and ESP), as will be described further below. Reorder buffer 216 contains temporary storage locations for results which change the contents of these registers to thereby allow out of order execution. A temporary storage location of reorder buffer 216 is reserved for each instruction which, upon decode, modifies the contents of one of the real registers. Therefore, at various points during execution of a particular program, reorder buffer 216 may have one or more locations which contain the speculatively executed contents of a given register. If following decode of a given instruction it is determined that reorder buffer 216 has previous location(s) assigned to a register used as an operand in the given instruction, the reorder buffer 216 forwards to the corresponding reservation station either: 1) the value in the most recently assigned location, or 2) a tag for the most recently assigned location if the value has not yet been produced by the functional unit that will eventually execute the previous instruction. If the reorder buffer has a location reserved for a given register, the operand value (or tag) is provided from reorder buffer 216 rather than from register file 218. If there is no location reserved for a required register in reorder buffer 216, the value is taken directly from register file 218. If the operand corresponds to a memory location, the operand value is provided to the reservation station unit through load/store unit 222.

Details regarding suitable reorder buffer implementations may be found within the publication "Superscalar Microprocessor Design" by Mike Johnson, Prentice-Hall, Englewood Cliffs, N.J., 1991, and within the co-pending, commonly assigned patent application entitled "High Performance Superscalar Microprocessor", Ser. No. 08/146,382, filed Oct. 29, 1993 by Witt, et al. These documents are incorporated herein by reference in their entirety.

Reservation station units 210A–210F are provided to temporarily store instruction information to be speculatively executed by the corresponding functional units 212A–212F. As stated previously, each reservation station unit 210A–210F may store instruction information for up to three pending instructions. Each of the six reservation stations 210A–210F contain locations to store bit-encoded execution instructions to be speculatively executed by the corresponding functional unit and the values of operands. If a particular operand is not available, a tag for that operand is provided from reorder buffer 216 and is stored within the corresponding reservation station until the result has been generated (i.e., by completion of the execution of a previous instruction. It is noted that when an instruction is executed by one of the functional units 212A–212F, the result of that instruction is passed directly to any reservation station units 210A–210F that are waiting for that result at the same time the result is passed to update reorder buffer 216 (this technique is commonly referred to as "result forwarding"). Instructions are issued to functional units for execution after the values of any required operand(s) are made available. That is, if an operand associated with a pending instruction within one of the reservation station units 210A–210F has been tagged with a location of a previous result value within reorder buffer 216 which corresponds to an instruction which modifies the required operand, the instruction is not issued to the corresponding functional unit 212 until the operand result for the previous instruction has been obtained. Accordingly, the order in which instructions are executed may not be the same as the order of the original program instruction sequence. Reorder buffer 216 ensures that data coherency is maintained in situations where read-after-write dependencies occur.

In one embodiment, each of the functional units 212 is configured to perform integer arithmetic operations of addition and subtraction, as well as shifts, rotates, logical operations, and branch operations. It is noted that a floating point unit (not shown) may also be employed to accommodate floating point operations.

Each of the functional units 212 also provides information regarding the execution of conditional branch instructions to the branch prediction unit 220. If a branch prediction was incorrect, branch prediction unit 220 flushes instructions subsequent to the mispredicted branch instruction that have entered the instruction processing pipeline, and causes prefetch/predecode unit 202 to fetch the required instructions from instruction cache 204 or main memory. It is noted that in such situations, results of instructions in the original program sequence which occur after the mispredicted branch instruction are discarded, including those which were speculatively executed and temporarily stored in load/store unit 222 and reorder buffer 216. Exemplary configurations of suitable branch prediction mechanisms are well known.

Results produced by functional units 212 are sent to the reorder buffer 216 if a register value is being updated, and to the load/store unit 222 if the contents of a memory location is changed. If the result is to be stored in a register, the reorder buffer 216 stores the result in the location reserved for the value of the register when the instruction was decoded. As stated previously, results are also broadcast to reservation station units 210A–210F where pending instructions may be waiting for the results of previous instruction executions to obtain the required operand values.

Data cache 224 is a high speed cache memory provided to temporarily store data being transferred between load/store unit 222 and the main memory subsystem. In one embodiment, data cache 224 has a capacity of storing up to eight kilobytes of data. It is understood that data cache 224 may be implemented in a variety of specific memory configurations, including a set associative configuration.

Generally speaking, load/store unit 222 provides an interface between functional units 212A–212F and data cache 224. In one embodiment, load/store unit 222 is configured with a load/store buffer with sixteen storage locations for data and address information for pending load or store memory operations, wherein the storage locations are configured as a linear array of storage locations. However, it is understood that the number of storage locations may vary in further embodiments of the invention. Functional units 212 arbitrate for access to the load/store unit 222. When the buffer is full, a functional unit must wait until the load/store unit 222 has room for the pending load or store request information. The load/store unit 222 also performs dependency checking for load memory operations against pending store memory operations to ensure that data coherency is maintained. Load memory operations may be executed by the load/store unit 222 in a different order than they are provided to the load/store unit 222. Store memory operations are always executed in the order that they were provided.

In one embodiment, decode units 208 indicate to the load/store unit 222 what kind of memory operation each decode unit is decoding in a given cycle. The decode units 208 will indicate one of four possible conditions: no load/store operation has been decoded, a load operation has been decoded, a store operation has been decoded, or a load-op-store operation has been decoded. Load-op-store operations occupy two storage locations in the load/store buffer, one for the load operation and one for the store operation. These operations are then treated as independent operations in the load/store buffer. At least one clock cycle later, the address and the data (for stores) is provided by the functional units 212 to the load/store unit 222. This information is transferred into the storage location that holds the memory operation that the address and data is associated with. This association is determined by comparing reorder buffer tags provided by functional units 212 to reorder buffer tags previously stored in the load/store buffer.

In one embodiment, load and store memory operations that are stored in the load/store buffer are indicated to be no longer speculative by at least one pointer from reorder buffer 216. The pointer is a tag value which can be compared by the load/store unit 222 to the tags stored in the plurality of storage locations within the load/store buffer to update the speculative status of the memory operations stored therein. In another embodiment, the number of pointers provided by the reorder buffer 216 is two.

In one embodiment, the load/store unit selects up to two memory operations per clock cycle to access the data cache. The load/store unit uses a fixed priority scheme for making the selection. The scheme is as follows: stores that are no longer speculative are highest priority, loads that are misses and are no longer speculative are second highest priority, and loads that are speculative and have not yet accessed the cache are last in priority. Stores are higher priority than loads because they are the oldest instructions in the reorder buffer when they are no longer speculative, and it is desirable to retire them as quickly as possible. Load misses also are not processed until they are non-speculative due to the long latency of main memory transfers. If the load is cancelled, the data will not be useful but the long latency transfer will continue, possibly blocking other transfers needing access to main memory.

Other considerations that also affect which memory operations are selected to access the data cache are: the alignment of the operation and the bank of the data cachet that an operation is going to access. If a load memory operation is selected for the first access of a given cycle and is unaligned, then the second access selected will be either an aligned memory operation or the second access will not be made in the current cycle. In the next cycle, the second half of the unaligned load memory operation is selected as the first access. If a store memory operation is selected for the first access of a given cycle and is unaligned, then the second access made in that cycle is the second half of the store memory operation. If either store access misses the data cache, both halves are aborted and the line that contains the miss is transferred to the data cache from main memory. If an aligned memory operation is selected as the first access and an unaligned load memory operation is selected as the second access, then in the next clock cycle the second access selected will be the second half of the unaligned load memory operation. If an aligned memory operation is selected as the first access and an unaligned store memory operation is selected as the second access, then the second access will not be made in this clock cycle.

Bank conflicts are also considered by the load/store unit in selecting memory operations to access the data cache in a given cycle. If two operations have been selected to access the data cache in a given cycle, and bits 2, 3, and 4 of their respective addresses are equal, then the second access will not be made in this cycle.

In another embodiment, a load memory operation is selected to access data cache 224 in a given cycle if load memory operations prior to the load memory operation in program order have accessed data cache 224 and been found to miss. The prior memory operations remain within the buffer and therefore require no extra buffers to store them, saving silicon area.

Figure 4A:
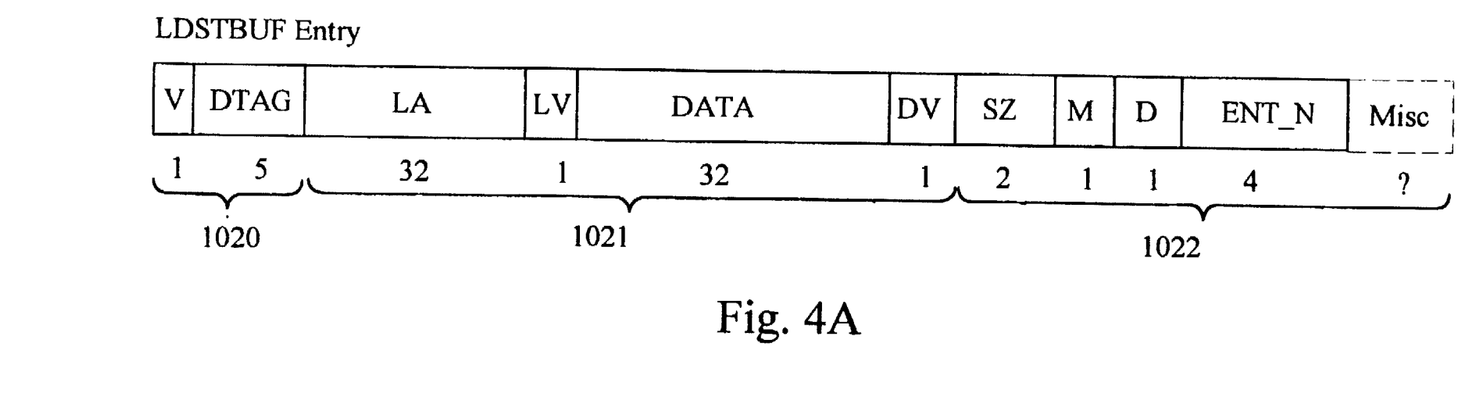
FIG. 4A is a diagram of a storage location from the load/store buffer shown in FIG. 3.

As will be shown in FIG. 4A, each entry in the load/store buffer of load/store unit 222 contains a miss/hit bit. The miss/hit bit is used in the selection of memory operations to access the data cache, in order to implement the non-blocking function. The miss/hit bit disqualifies load memory operations that are speculative from selection for access to the data cache. In this way, a speculative load memory operation that is subsequent to a speculative load memory operation that misses the data cache may be selected to access the data cache. Therefore, load/store unit 222 implements a non-blocking scheme in which load memory operations are allowed to access the data cache in clock cycles in which speculative load memory operations that have missed the data cache exist in the load/store buffer. In one embodiment, 8 locations (starting from the bottom of the load/store buffer) are scanned for such load memory operations, allowing up to 7 speculative load misses to be stored in the load/store buffer before blocking occurs.

Another important factor in the non-blocking scheme of load/store unit 222 is that the comparators required by previous non-blocking schemes to ensure that only one request per cache line is made to the main memory system are not required. As noted above, these comparators are necessary in prior non-blocking schemes to keep a second miss to the same line as a miss already queued for access to the main memory system from accessing the memory system. Typically in these previous schemes, when a second request is made for the line currently being fetched from main memory, blocking occurs. Load/store unit 222 holds the misses in the load/store buffer. When one miss becomes non-speculative, it accesses main memory while other misses remain in the buffer. When the data associated with the address that missed is transferred into data cache 224, the miss/hit bits in the load/store buffer are reset such that the associated memory operations are no longer considered to be misses. Therefore, the associated memory operations will be selected to access data cache 224 in a subsequent clock cycle. If the memory operation is now a hit, it completes in the same manner as other speculative load memory operations that hit the data cache. If the memory operation is still a miss, the miss/hit bit is set to indicate miss, and the memory operation waits to become non-speculative. Therefore, the comparators are not necessary and multiple misses to the same cache line do not cause blocking.

In one embodiment, load memory operations are selected for removal from the load/store buffer if the operation is a data cache hit. Load memory operations are further selected for removal if the load operation has missed the data cache, is no longer speculative (as indicated by the aforementioned reorder buffer pointers), and the line containing the miss is selected to be transferred from main memory (not shown) to the data cache. Store memory operations are selected for removal from the load/store buffer if the store memory operation is non-speculative (as indicated by the aforementioned reorder buffer pointers), and the store memory operation is a data cache hit. Store memory operations are further selected for removal from the load/store buffer if the store memory operation is non-speculative (as indicated by the aforementioned reorder buffer pointers), the store memory operation is a data cache miss, and the line containing the miss is selected to be transferred from main memory to the data cache. In another embodiment, memory operations are selected for removal from the load/store buffer if a cancel signal is received from reorder buffer 216, along with a reorder buffer tag that matches the memory operation.

Figure 2:
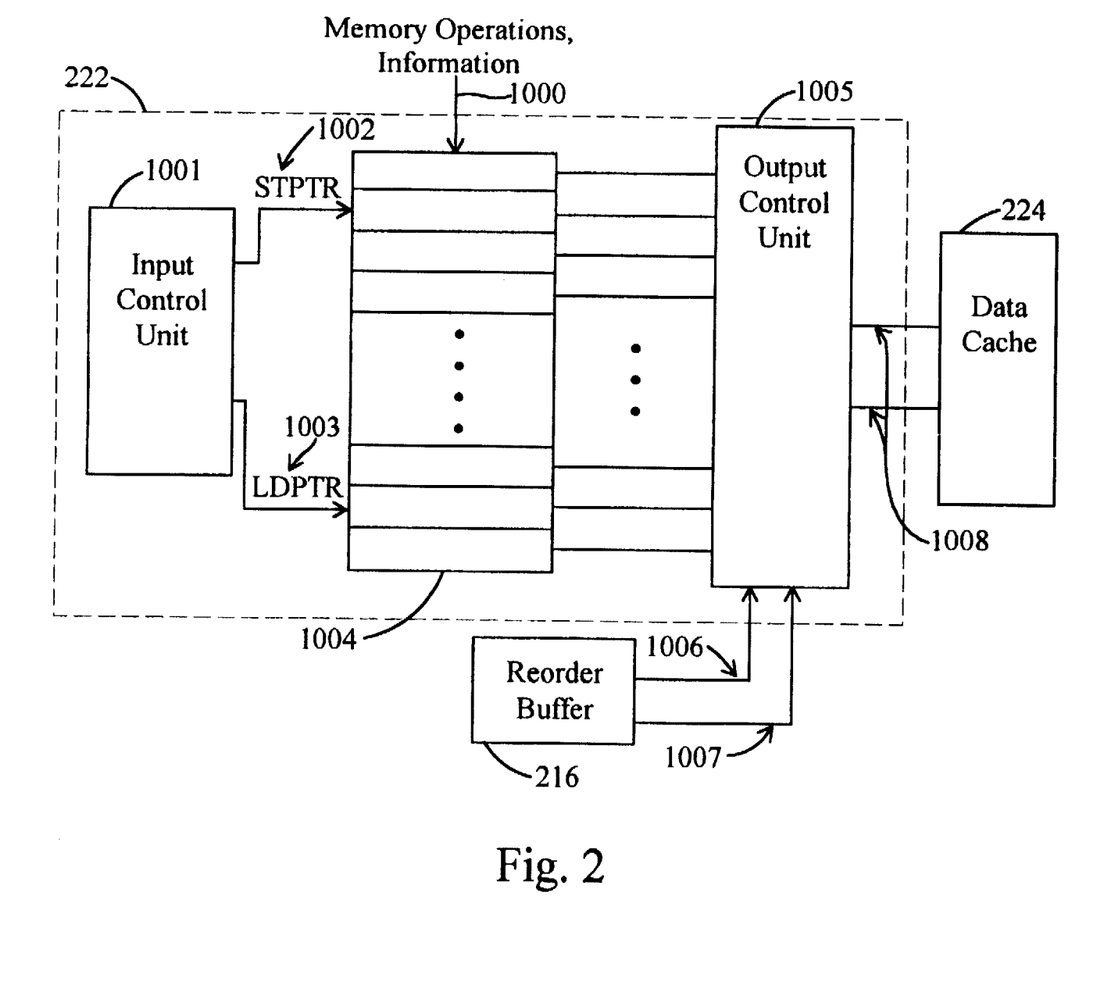
FIG. 2 is a block diagram of a load/store unit in accordance with the present invention coupled to a data cache.

Turning now to FIG. 2, a block diagram of a load/store unit in accordance with the present invention is shown. Load/store unit 222 is shown to include an input port 1000 for receiving memory operation commands and information associated with those operations. In one embodiment, up to six operations may be provided in a given clock cycle. The information comprises the linear address associated with the instruction and also data, if the memory operation is a store. This information is provided at least one clock cycle after the associated memory operation command is provided. As FIG. 2 shows, load/store unit 222 comprises input control unit 1001, store pointer 1002, load pointer 1003, load/store buffer 1004, output control unit 1005, input reorder buffer pointers 1006 and 1007, and data cache ports 1008. In one embodiment, load/store buffer 1004 is configured as a linear array of storage locations.

Input control unit 1001 directs memory operations 1000 to particular storage locations within load/store buffer 1004. In one embodiment, this direction is accomplished through the use of two pointers: store pointer 1002 and load pointer 1003. Each store memory operation that is received in a given clock cycle is transferred into a storage location within load/store buffer 1004 beginning at the storage location pointed to by store pointer 1002, and increasing in storage location numbers for each subsequent store memory operation received. Store pointer 1002 is then incremented by the number of store operations received in the clock cycle. Similarly, each load memory operation that is received in a given clock cycle is transferred into a storage location within load/store buffer 1004 beginning at the storage location pointed at by load pointer 1003, and decreasing in storage location numbers for each subsequent load memory operation received. Load pointer 1003 is then decremented by the number of load operations received in the clock cycle. It is the responsibility of the decode units 208 to dispatch only as many load and store memory operations as can be stored between store pointer 1002 and load pointer 1003. The load unit provides communication to the decode units 208 in the form of the difference between load pointer 1003 and store pointer 1002 to aid the decode unit in this function.

In one embodiment, when the load/store buffer is empty, store pointer 1002 points to the first storage location and load pointer 1003 to the last storage location in the load/store buffer 1004. The store pointer 1002 is incremented for each store memory operation received into the load/store buffer, and the load pointer 1003 is decremented for each load memory operation received into the load/store buffer. As load memory operations are removed from the load/store buffer 1004, the storage locations between load pointer 1003 and the end of the load/store buffer 1004 are copied into the storage locations below which are vacated by the removed load memory operations. The copying occurs in such a way that the remaining memory operations occupy contiguous positions at the end of load/store buffer 1004 and the remaining memory operations are still in program order. The removed load memory operations need not be contiguous in the buffer. The load pointer 1003 is then incremented by the number of load instructions removed. Similarly, as store memory operations are removed from the load/store buffer 1004, the storage locations between store pointer 1002 and the beginning of the load/store buffer 1004 are copied into the storage locations above which are vacated by the removed store memory operations. The copying occurs in such a way that the remaining memory operations occupy contiguous positions at the beginning of load/store buffer 1004 and the remaining memory operations are still in program order. The removed store memory operations need not be contiguous in the buffer. The store pointer 1002 is then decremented by the number of store memory operations removed.

Output control unit 1005 selects memory operations stored in load/store buffer 1004 for access to the data cache 224. In one embodiment, output control unit 1005 selects up to two memory operations for the aforementioned access. The output control unit 1005 implements the priority scheme described above for selecting the memory operations. Reorder buffer pointers 1006 and 1007 are used to indicate which memory operations are no longer speculative, as described above.

Figure 3:
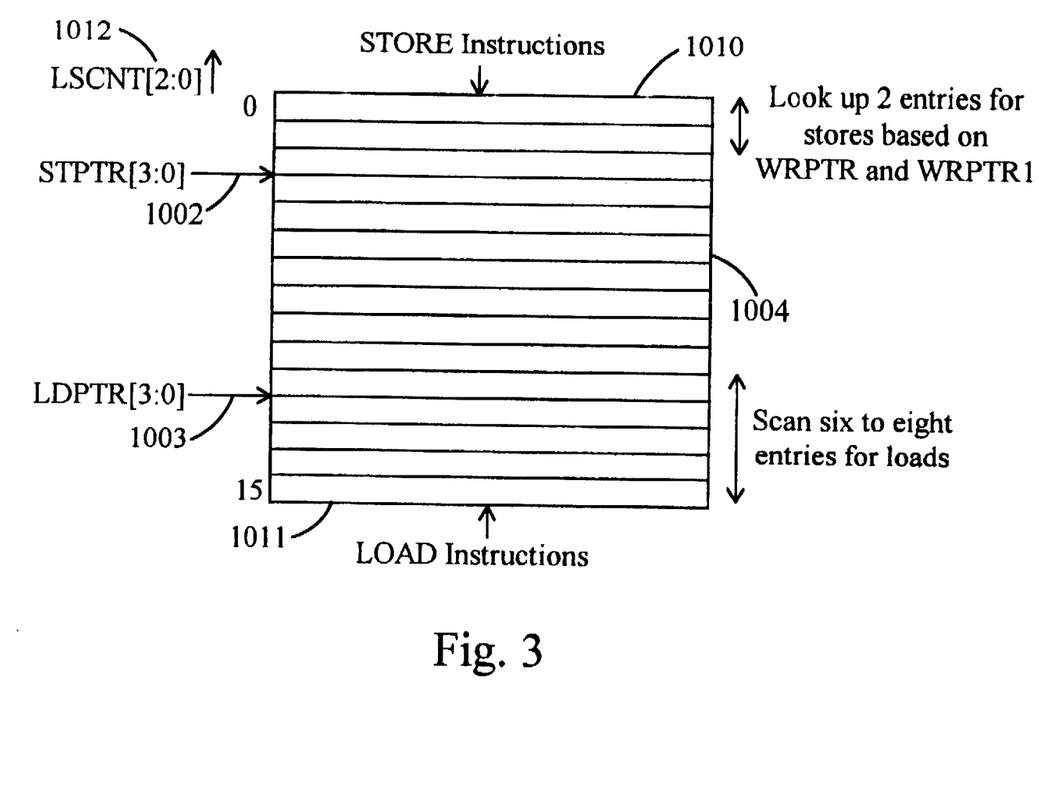
FIG. 3 is a block diagram of a load/store buffer in accordance with the present invention.

Turning next to FIG. 3, an embodiment of load/store buffer 1004 is shown in more detail. Shaded area 1010 depicts storage locations that are holding store memory operations. Shaded area 1011 depicts storage locations that are holding load memory operations. In this embodiment, the storage locations are configured as a linear array of locations. A linear array of locations is an organization of locations wherein each location can be located within the array utilizing a single number. Store memory operations are transferred into the buffer from one end, while load memory operations are transferred into the buffer from the opposite end. In this way, the properties of storing load memory operations and store memory operations in separate queuing structures are maintained. However, this embodiment advantageously makes use of a single set of storage locations to provide both load and store queuing locations. Hardware, and hence silicon area, are saved as compared to a performance-equivalent number of separate load and store buffers. For example, this embodiment contains 16 storage locations. At any given time up to 16 store memory operations, or alternatively 16 load memory operations, could be stored in the load/store buffer 1004. A performance-equivalent number of separate load and store buffers would therefore require 16 load buffers and 16 store buffers. Each of these buffers would be required to contain the same information that the load/store buffer 1004 contains. Therefore, the separate load and store buffer solution commonly used in superscalar microprocessors consumes considerably more silicon area than load/store buffer 1004.

Also shown in FIG. 3 are load pointer 1003 and store pointer 1002. Because this embodiment contains 16 storage locations, load pointer 1003 and store pointer 1002 are depicted as four bit pointers. In other embodiments, the number of storage locations may vary and therefore the number of bits that load pointer 1003 and store pointer 1002 require may vary as well. Other embodiments may also be configured with load/store buffer 1004 as some other organization than a linear array. For example, a two dimensional array might be used, in which a storage location is identified by a pointer consisting of two numbers: a row and a column number. It is understood that there are other possible ways to configure load/store buffer 1004. In one embodiment, store pointer 1002 is not allowed to become equal to or greater than load pointer 1003. In this way, load memory operations and store memory operations are stored in storage locations distinct from each other in any given clock cycle.

Also shown in FIG. 3 is an output LSCNT[2:0] 1012. This output is the difference between load pointer 1003 and store pointer 1002, and in one embodiment indicates how many memory operations may be transferred to the load/store unit 222. Units that transfer memory operations to the load/store unit 222 use this information in their algorithms to limit the number of memory operations transferred in a given clock cycle.

Turning now to FIG. 4A, a diagram of the storage locations within load/store buffer 1004 is shown. The storage locations are divided into three fields. In one embodiment, the first field consists of 6 bits. One bit is a valid bit, indicating when set that the storage location contains a memory operation and indicating when not set that the storage location does not contain a memory operation. The remaining five bits of the first field comprise a tag which indicates which entry in the reorder buffer 216 the memory operation is associated with.

The second field 1021 consists of 66 bits. The first 32 bits of the field are the address that the memory operation is to manipulate. The next bit is an address valid bit, indicating when set that the aforementioned address has been provided and indicating when not set that the aforementioned address has not been provided. The next 32 bits in field 1021 are the data associated with the memory operation. For stores, these bits contain the data that is to be stored at the aforementioned address. For data that is less than 32 bits wide, the data is stored in field 1021 in a right-justified manner. The final bit in field 1021 is a data valid bit, indicating when set that the aforementioned data has been provided and indicating when not set that the aforementioned data field has not been provided.

The third field 1022 of the storage locations contains other important information for each memory operation. In one embodiment, the following information is saved:

the size of the data to be manipulated measured in bytes;

the miss/hit state of the memory operation in data cache 224, wherein this bit being set indicates a miss and this bit not being set indicates that the operation has not accessed the data cache;

the dependent bit, wherein this bit being set indicates that a load memory operation is dependent on a store memory operation stored in another storage location of the load/store buffer and this bit not being set indicates that no such dependency exists;

the entry number of the storage location containing the aforementioned dependency, wherein this field contains random information if the aforementioned dependent bit is not set. Other embodiments store additional miscellaneous information in field 1022.

Figure 4B:
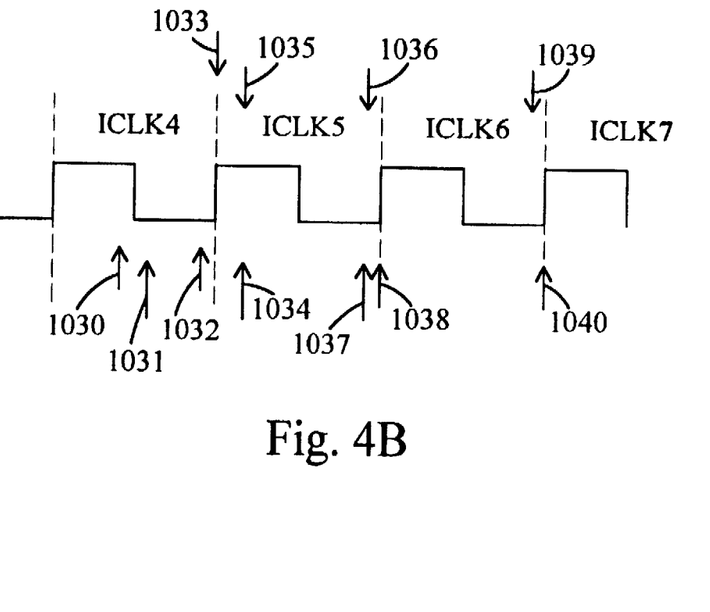
FIG. 4B is a diagram of several clock cycles indicating when certain information arrives at the load/store buffer shown in FIG. 3 and certain other functions associated with operating the load/store buffer.

Turning now to FIG. 4B, a timing diagram showing typical operation of one embodiment of the load/store unit is shown. Three complete clock cycles are shown, labeled ICLK4, ICLK5, and ICLK6. In ICLK4, load and/or store memory operations are received as indicated by arrow 1030. The load pointer is decremented by the number of load memory operations received in clock cycle ICLK4 at arrow 1031. The number of load memory operations received in a given cycle can be zero or more. The store pointer is also incremented by the number of store memory operations received in ICLK4 at arrow 1031. As with the load operations above, the number of store operations received in a given clock cycle can be zero or more. At arrow 1032, the load/store unit has calculated a news value for LSCNT 1012, which is the difference between the decremented value of load pointer 1003 and the incremented value of store pointer 1002.

At the beginning of ICLK5, as indicated by arrow 1033, the load/store unit 222 examines the tags of memory operations currently residing in the load/store buffer 1004, and begins the process of selecting operations to access the data cache for this cycle. The fixed priority scheme as described above is used as the selection criteria. At arrow 1034, tags for memory operations that are being provided with addresses and/or data are transferred to the load/store unit from functional units 212. This information is used in the selection process at arrow 1035. At arrow 1036, the selection process is complete and up to two access for the data cache have been selected. At arrow 1037, the address and data that were indicated as being transferred in this clock cycle (at arrow 1034) are provided by the functional units 212. The address and data are transferred into the storage locations within the load/store buffer at arrow 1038.

In clock cycle ICLK6, the data cache 224 is accessed. Also in this clock cycle, if one or both of the memory operations accessing the cache is a load memory operation, the tags of the load memory operations first field 1020 of FIG. 4A are compared to the tags of any stores that are currently stored in the load/store buffer. Simultaneously, the addresses of the load memory operation and any stores that are currently stored in the load/store buffer are compared. If the load memory operation is found to be after the store operation in program order via the aforementioned tag compare and the address of the load is found to completely overlap the address of the store via the aforementioned address compare, then the data that the load memory operation is attempting to retrieve is actually the data in the store memory operations storage location. This data is provided from the data portion of the store memory operation's storage location. In this context, "completely overlap" means that all of the bytes that the load memory operation is retrieving are contained within the bytes that the store memory operation is updating. Also, "partially overlap" means that some of the bytes that the load memory operation is retrieving are contained within the bytes that the store memory operation is updating. If the aforementioned data has not been provided to the load/store unit, or the address of the load memory operation partially overlaps the store memory operation, then the load memory operation does not retrieve its data in this cycle. Instead, it remains in the load/store buffer until the store memory operation is performed. If a store memory operation in the buffer is before a load memory operation in program order but the store memory operation does not yet contain a valid address for comparison, the load memory operation is treated as if the store address partially overlaps the load memory operation. If the load memory operation is found to be before any store memory operations that might be in the load/store buffer, or if the load memory operation's address does not match any of the store memory operation's address, then the data for the load memory operation is provided from the data cache. If the load memory operation is a data cache miss, and the conditions mentioned in the previous sentence are met, no data is provided for the load memory operation in this clock cycle.

At arrow 1039, the result of the operation is driven to the reorder buffer 216. At arrow 1040, the miss bit and the dependent bit in field 1022 (as shown in FIG. 4A) of the memory operations accessing the data cache in this clock cycle are updated with the miss/hit state of the access and any dependency on stores in the load/store buffer that was detected.

Figure 4C:
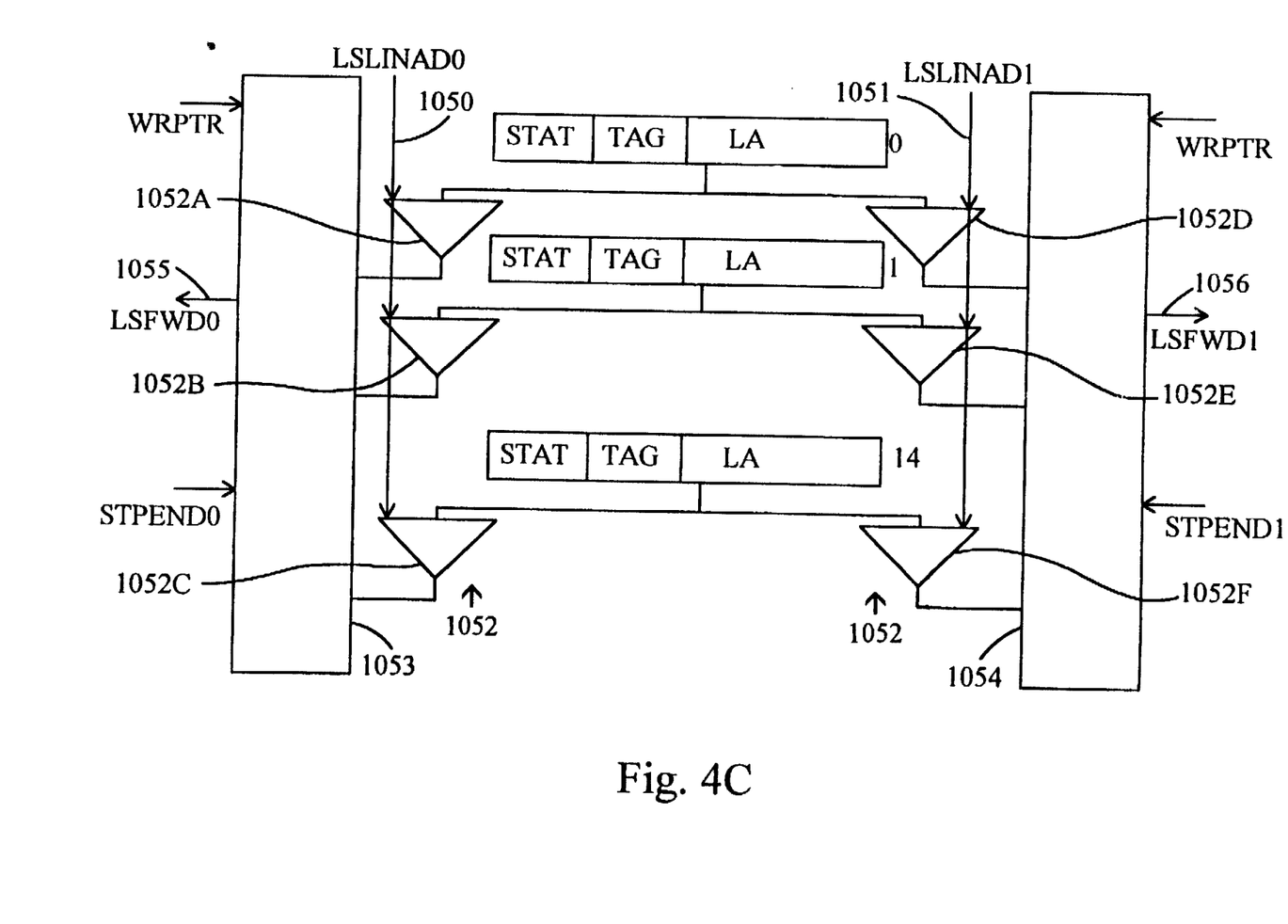
FIG. 4C is a block diagram showing store data forwarding for loads that access memory locations that are currently represented by stores in the load/store buffer.

Turning now to FIG. 4C, exemplary hardware implementing the aforementioned memory operation dependency checking is shown. The arrows 1050 and 1051 indicate the addresses of the two memory operations selected to access the data cache in this clock cycle. The addresses are conveyed on a pair signal lines labeled LSLINAD0[31:2] and LSLINAD1[31:2] for the first and second accesses, respectively. These addresses are compared to the addresses stored in each of the storage locations within load/store buffer 1004 using comparators 1052A–1052F. Whether or not the addresses overlap is indicated at the output of the comparators. This information is input to control units 1053 and 1054, which also perform the tag comparisons mentioned above. If a tag comparison shows that the memory operation is after the operation residing in the load/store buffer and the address comparison snows complete overlap, then the store data is forwarded as outputs 1055 and 1056, respectively. This data is then used as the result of load memory operation. If the load memory operation depends on a store memory operation but that store memory operation's data has not been provided, then the load memory operations remains in the load/store buffer 1004 until the store memory operation's data is provided.

Figure 4D:
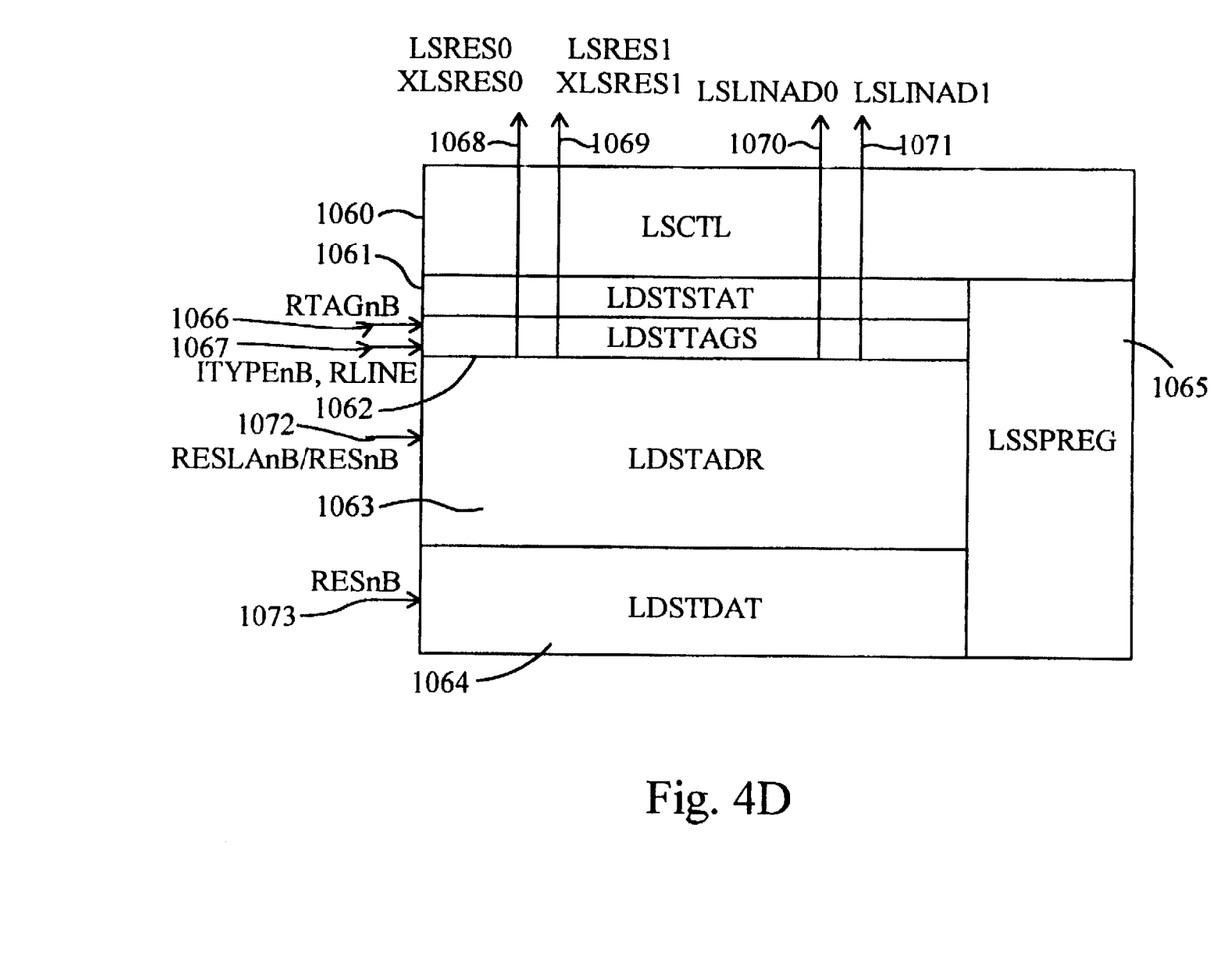
FIG. 4D is a block diagram showing the layout of various sections of the load/store unit of the present invention.

Turning now to FIG. 4D, a diagram of the load/store unit 222 is shown. The load/store unit 222 is divided into several partitions. LSCTL 1060 is the control block. This block contains the logic gates necessary to control the load/store buffer 1004, as well as other portions of the load/store unit. LDSTSTAT 1061 contains the status information for each of the storage locations in the load/store buffer. That is, LDSTSTAT 1061 contains the information of field 1022 of FIG. 4A. LDSTTAGS 1062 contains the information of field 1020 of FIG. 4A for each storage location of load/store buffer 1004. LDSTADR 1063 contains the address portion of field 1021 of FIG. 4A for each storage location of load/store buffer 1004. LDSTDAT 1064 contains the data portion of field 1021 of FIG. 4A for each storage location of load/store buffer 1004. Finally, LSSPREG 1065 contains segment registers, which are further described below.

FIG. 4D also shows inputs 1000 of FIG. 2, herein shown as the signals used in one embodiment. RTAGnB 1066 is a set of signals providing the tag that identifies the position of the memory operation within the reorder buffer 216. ITYPEnB 1067 identifies the memory operation as either a load, a store, or a load-op-store operation. RESLAnB 1072 provides the address for memory operations, and RESnB 1073 provides the data for store memory operations.

FIG. 4D also shows outputs of the load/store unit 222. LSRES0/XLSRES0 1068 is the data output for the first access to the data cache 224. The two sets of signals are provided as differential inputs to the reorder buffer. Similarly, LSRES1/XLSRES1 1069 is the data output for the second access to the data cache 224. Also, LSLINAD0 1070 and LSLINAD1 1071 are the addresses for the first and second data cache accesses, respectively.

In accordance with the foregoing description, a high performance superscalar microprocessor including a load/store unit employing a unified load/store buffer has been described which implements, in a substantially smaller space, a performance-equivalent buffer to the separate load and store buffers commonly used. The unified buffer stores both load and store memory operations, storing loads from one end of the buffer and stores from the other end. In this way, the properties of storing loads and stores in separate buffers are maintained while the physical space required for the buffers is advantageously reduced.

Numerous variations and modifications will become apparent to those skilled in the art once the above disclosure is fully appreciated. It is intended that the following claims be interpreted to embrace all such variations and modifications.

What is claimed is:

1. A load/store unit for implementing non-blocking load memory operations in a superscalar microprocessor comprising:

a buffer including a plurality of storage locations configured to store information regarding pending memory operations wherein said buffer further includes an input port configured to receive said information, and wherein said buffer further includes a data cache port configured to communicate data access commands to a data cache, and wherein each of said plurality of storage locations is configured to store a miss bit and a corresponding memory operation, and wherein said miss bit is indicative, in a first state, that said corresponding memory operation misses said data cache; and an output control unit coupled to said buffer, wherein said output control unit is configured to select a particular memory operation stored within a particular one of said plurality of storage locations within said buffer if said miss bit stored in said particular one of said plurality of storage locations is in a second state different from said first state and each one of said plurality of storage locations which is storing a memory operation prior to said particular memory operation in program order is storing said miss bit in said first state, and wherein said output control unit is further configured to direct a data access command associated with said particular memory operation to said data cache.

2. The load/store unit as recited in claim 1 wherein said buffer is configured as a linear array of storage locations for memory operations.

3. The load/store unit as recited in claim 1 wherein said output control unit is configured to select said particular memory operation from said buffer according to a fixed priority scheme.

4. A load/store unit for implementing non-blocking load memory operations in a superscalar microprocessor comprising:

a buffer including a plurality of storage locations configured to store information regarding pending memory operations wherein said buffer further includes an input port configured to receive said information, and wherein said buffer further includes a data cache port configured to communicate data access commands to a data cache, and wherein each of said plurality of storage locations are configured with a miss bit, and wherein said miss bit is configured to be set during a clock cycle in which said memory operation accesses said data cache and misses said data cache; and an output control unit coupled to said buffer, wherein said output control unit is configured to select a memory operation stored within said plurality of storage locations within said buffer, and wherein said output control unit is further configured to direct a data access command associated with said operation to said data cache;

wherein said output control unit is configured to select said memory operation from said buffer according to a scheme wherein:

store memory operations that are not speculative are given a high priority;

memory operations that are not speculative and are known to miss said data cache via previous access to said data cache are given an intermediate priority; and load memory operations that have not previously accessed said data cache are given a low priority.

5. The load/store unit as recited in claim 4 wherein said output control unit is configured with a pointer provided by a reorder buffer, wherein said pointer is configured to indicate the speculative state of said memory operation.

6. The load/store unit as recited in claim 5 wherein said output control unit is further configured to select a load memory operation during a clock cycle in which previous load memory operations which are indicated as speculative by said pointer provided by said reorder buffer have said miss bits associated with said previous memory operations set.

7. The load/store unit as recited in claim 1 wherein said miss bit stored in each of said plurality of storage locations is reset during a second clock cycle in which said data cache is updated with a plurality of bytes transferred from a main memory.

8. The load/store unit as recited in claim 1 wherein said buffer is configured to store a miss memory operation that is speculative and has said miss bit associated with said miss memory operation in the set state until a clock cycle in which said memory operation is selected to transfer a plurality of bytes from main memory to said data cache.

9. A method for selecting a second memory operation stored in a load/store buffer for access to a data cache during a clock cycle in which a first memory operation stored in said load/store buffer is speculative and is known to miss said data cache, comprising:

examining said first memory operation to determine that a miss bit associated with said first memory operation is in a first state indicative that said first memory operation misses said data cache; and selecting said second memory operation for access to said data cache in response to detecting said miss bit associated with said first memory operation in said first state, wherein said second memory operation is subsequent to said first memory operation in program order.

10. The method as recited in claim 9 further comprising setting said miss bit associated with said first memory operation during a clock cycle in which said first memory operation accesses said data cache and is found to miss.

11. The method as recited in claim 9 further comprising resetting said miss bit associated with said first memory operation during a clock cycle in which a plurality of bytes are transferred from main memory to said data cache.

12. The method as recited in claim 9 further comprising storing said first memory operation within said load/store buffer until a clock cycle in which said first memory operation is indicated to be non-speculative and is selected to transfer a plurality of bytes from a main memory to said data cache.

13. The method as recited in claim 11 further comprising selecting said first memory operation to access said data cache during a second clock cycle after said resetting step.

14. The method as recited in claim 9 further comprising selecting said first memory operation to access said data cache in response to detecting that said miss bit is in a second state different from said first state.

15. A load/store unit for implementing non-blocking load memory operations in a superscalar microprocessor comprising:

a buffer including a plurality of storage locations configured to store information regarding pending memory operations wherein said buffer further includes an input port configured to receive said information, and wherein said buffer further includes a data cache port configured to communicate data access commands to a data cache, and wherein each of said plurality of storage locations are is configured with to store a miss bit and a corresponding memory operation, and wherein said miss bit is configured to be set during a clock cycle in which said memory operation accesses said data cache and indicative, in a first state, that said corresponding memory operation misses said data cache; and an output control unit coupled to said buffer, wherein said output control unit is configured to select a particular memory operation stored within a particular one of said plurality of storage locations within said buffer in response to detecting that said miss bit stored in said particular one of said plurality of storage locations is in a second state different from said first state and detecting that each one of said plurality of storage locations which is storing a memory operation prior to said particular memory operation in program order is storing said miss bit in said first state, and wherein said output control unit is further configured to direct a data access command associated with said particular memory operation to said data cache.

16. The load/store unit as recited in claim 15 wherein said buffer is configured as a linear array of storage locations for memory operations.

17. The load/store unit as recited in claim 15 wherein said output control unit is configured to select a new memory operation from said buffer according to a fixed priority scheme.

18. The load/store unit as recited in claim 15 wherein said output control unit is configured to select a new memory operation from said buffer according to a scheme wherein:

store memory operations that are not speculative are given a high priority;

memory operations that are not speculative and are known to miss said data cache via previous access to said data cache are given an intermediate priority; and load memory operations that have not previously accessed said data cache are given a low priority.

19. The load/store unit as recited in claim 18 wherein said output control unit is configured with a pointer provided by a reorder buffer, wherein said pointer is configured to indicate the speculative state of said memory operation.

20. The load/store unit as recited in claim 19 wherein said output control unit is further configured to select a load memory operation during a clock cycle in which previous load memory operations which are indicated as speculative by said pointer provided by said reorder buffer have said miss bits associated with said previous memory operations set.

21. The load/store unit as recited in claim 15 wherein said miss bit stored in each of said plurality of storage locations is reset during a second clock cycle in which said data cache is updated with a plurality of bytes transferred from a main memory.

22. The load/store unit as recited in claim 15 wherein said buffer is configured to store a miss memory operation that is speculative and has said miss bit associated with said miss memory operation in the set state until a clock cycle in which said memory operation is selected to transfer a plurality of bytes from main memory to said data cache.

* * * * *